J. Smith.
Water Gate.
N° 6,248. Patented Apr. 3, 1849.
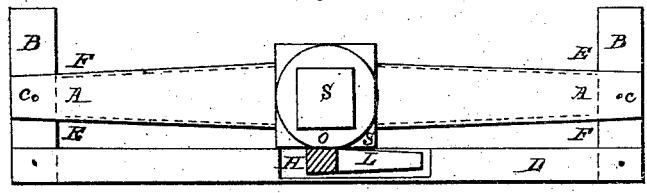
Fig. 1.
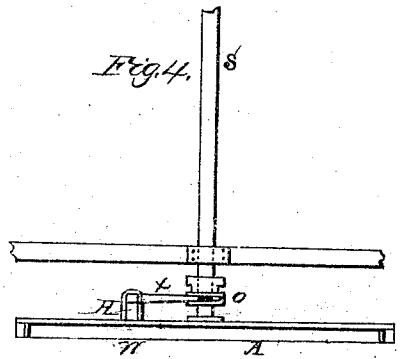
Fig. 4. Fig. 2.
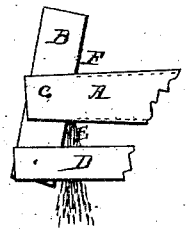
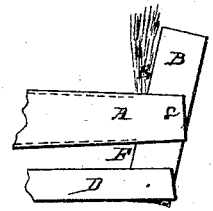
Fig. 3.
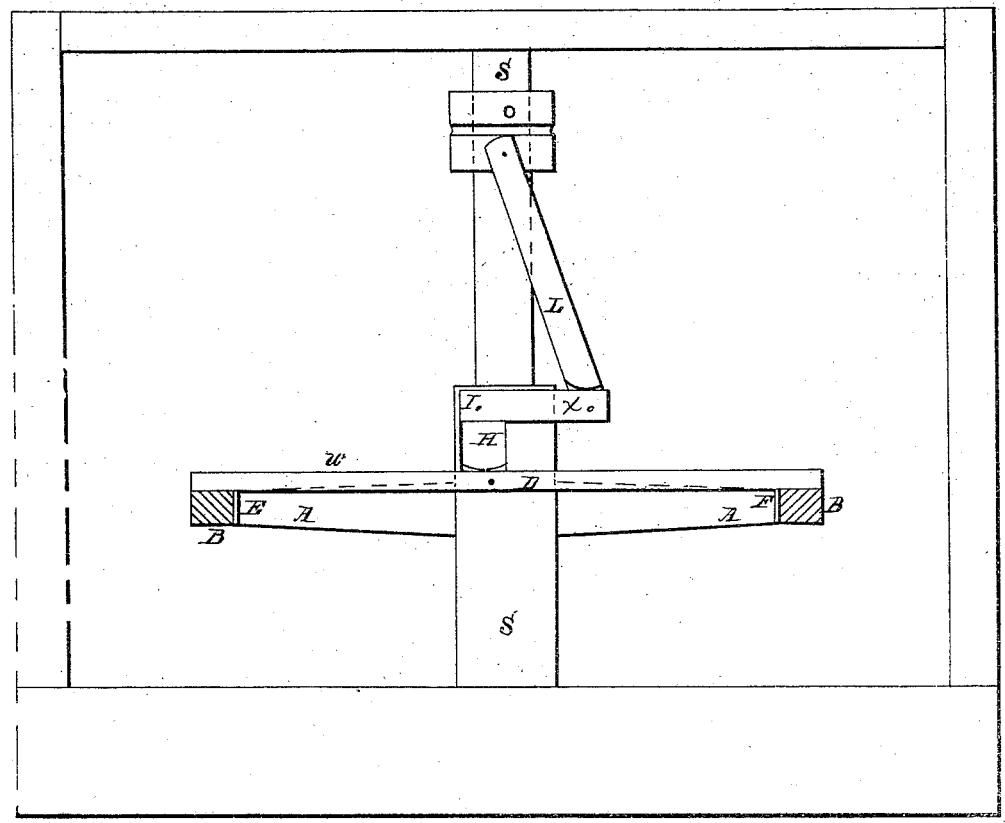
Fig. 5.

UNITED STATES PATENT OFFICE.

JESPER SMITH, OF MANSFIELD, NEW JERSEY.

REACTION WATER-WHEEL.

Specification of Letters Patent No. 6,248, dated April 3, 1849.

*To all whom it may concern:*

Be it known that I, JESPER SMITH, of Mansfield, in the county of Warren and State of New Jersey, have invented a new improved mode of applying water to a rotary engine or wheel, so as to reverse the motion of the machinery driven by it; and I do hereby declare that the following is a full and exact description of it.

The nature of my invention consists in placing valves on the end of the arms of a centrifugal wheel whereby the discharge of the water may be changed and the motion of the wheel consequently changed likewise.

To enable others skilled in the art to make and use my invention I will proceed to describe its construction and operation.

I construct my wheel in any of the known forms and fasten it to a revolving shaft S, at the end of the hollow arms A A. I place valves B B moving on the pivots C C, connected by the lever D, the valves B B, being so placed that when moved on the pivots C C, apertures will be left either at E E or F F in the sides of the arms of the wheel thereby causing the wheel to revolve on the shaft S either way according as the lever D, is moved by the elbow H which in turn is turned on the pivot I by the lever L, attached to the collar O, on the shaft S.

Figure 1 is a plan of the wheel in a state of rest with the valves at right angles to the radius of the wheel and the apertures for the discharge of the water being all open to half their full extent and if water was admitted through the engine in this position it would be discharged from each side of the arms and the action would be balanced.

Fig. 2 shows the ends of the arms, with the lever D, moved to the left and the apertures F F, closed and E E, open, move the lever D in an opposite direction and the discharge of the water is reversed.

Fig. 3 shows the shaft S, in an upright position—the valves B B, may be made concave at the side next the water to discharge it at right angles to the radius of the wheel if a stay is required on the shaft S, near the wheel the collar O may be placed between it and the wheel the elbow H being supported from the arm at $w$, a pin from the collar O, passing through a long hole in the lever $x$, as shown in the sketch Fig. 4.

What I claim as my invention and desire to secure by Letters Patent, is—

Causing water to flow at pleasure in different directions from the centrifugal water wheel or engine, thereby reversing the direction of its revolutions.

JESPER SMITH.

Witnesses:
JAMES I. BROWNE,
JOHN F. RANDOLPH.